July 3, 1951
M. PIRNIE
2,559,462
METHOD AND APPARATUS FOR SEPARATING OXIDIZABLE MATERIALS
FROM LIQUIDS BY OXYGENATION AND
AEROBIC BIOCHEMICAL ACTION
Filed March 26, 1948
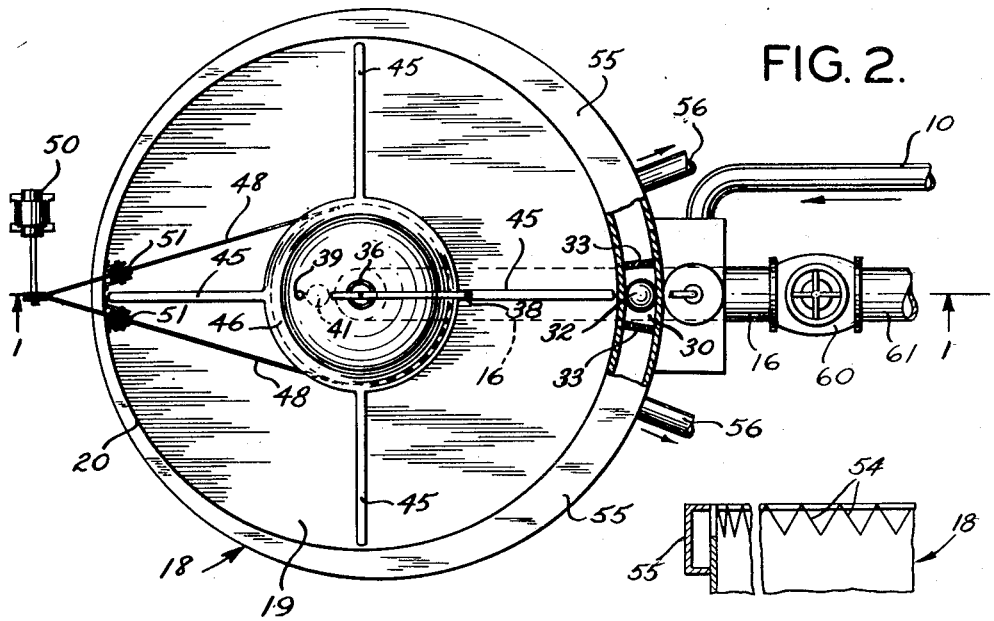
FIG. 2.
FIG. 3.
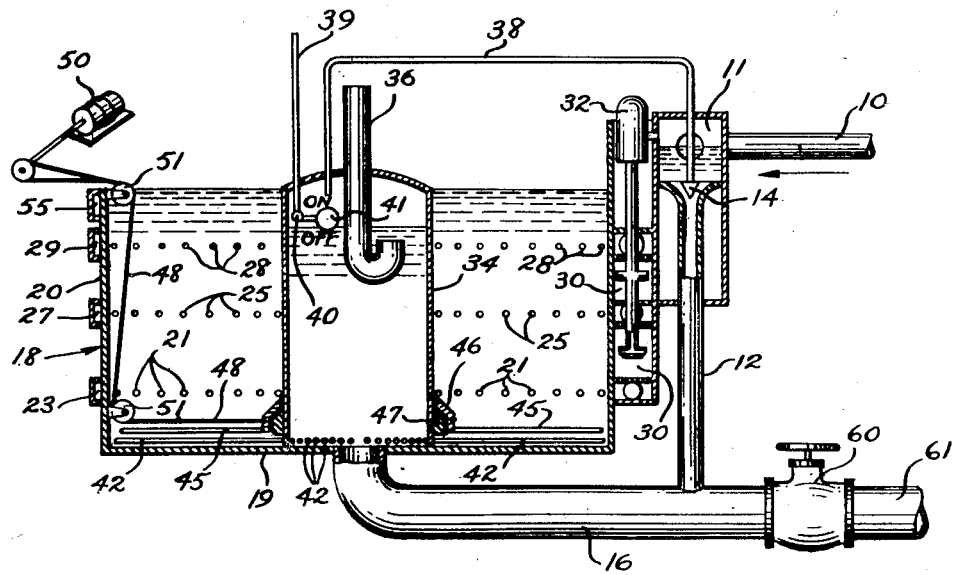
FIG. 1.
INVENTOR.
Malcolm Pirnie.
BY Emery, Varney,
Whittemore & Dix.
ATTORNEYS.

Patented July 3, 1951

2,559,462

UNITED STATES PATENT OFFICE 2,559,462

METHOD AND APPARATUS FOR SEPARATING OXIDIZABLE MATERIALS FROM LIQUIDS BY OXYGENATION AND AEROBIC BIOCHEMICAL ACTION

Malcolm Pirnie, Scarsdale, N. Y., assignor to Research Corporation, New York, N. Y., a corporation of New York Application March 26, 1948, Serial No. 17,144

18 Claims. (Cl. 210—8)

This invention relates to improved methods and apparatus for separating oxidizable materials from liquids by treating the liquid with commercially pure oxygen or with a gas containing oxygen, including air, and passing it upward through a biologically active floc constantly maintained suspended within the liquid.

In the activated sludge method for treating sewage, aerobic micro-biological organisms in the sewage are used to oxidize the organic matter masses that will settle for separation from the liquid in which the organic material is contained. Oxygen is necessary for the aerobic micro-biological organisms to sustain their life cycle in which they use the original organic material of the sewage and convert it into more stable oxidized compounds and into settleable solid material which is later separated from the liquid.

The amount of oxygen required by the aerobic micro-biological organisms in any particular mass is known as the "biochemical oxygen demand" for that mass. In the prior art the biochemical oxygen demand for activated sludge processes was supplied by pumping air into the activated sludge-sewage mixture. With this invention, commercially pure oxygen, as well as air or any other gas containing oxygen, is supplied only to the sewage being treated. This permits a more efficient utilization of the gas. The total amount of oxygen required is much smaller than would be expected, and other unexpected results include the drastic reduction in time required for the biochemical action, and the substantial saving in the investment in plant equipment that is made possible by the smaller size of the biochemical retention tanks necessary. The invention includes also a method and apparatus for utilizing oxygen in such a way that the oxygen not absorbed in the sewage is returned to the incoming stream containing new sewage.

It is an object of the invention to provide an improved method for flocculating organic matter contained in sewage into readily settleable masses or sludge which can be allowed to settle and can then be withdrawn for disposal. This permits discharge of supernatant liquid containing a relatively small residual amount of organic matter and dissolved oxygen sufficient to satisfy the biochemical oxygen demand of the residual organic matter. The invention can be used also for separating organic matter from various industrial wastes and from highly colored water as well as from sewage.

Another object is to provide an improved method for converting bases of salts dissolved in liquids into their higher oxidized and relatively insoluble forms and thereby effect substantial separation.

Other objects are to provide apparatus for separating the oxidizable materials from liquids in accordance with the methods of this invention. One important feature of the apparatus relates to a combination of elements by which any oxygen not used in the mass of material under treatment is recaptured and returned to the original oxygen supply chamber.

Other objects, features, and advantages of the invention will appear or be pointed out as the description proceeds.

In the drawing, forming a part hereof, in which like reference characters indicate corresponding parts in all the views, Fig. 1 is a diagrammatic sectional view of apparatus for treating masses of material with oxygen in accordance with this invention to separate oxidizable material from the liquid in which it is contained.

Fig. 2 is a diagrammatic, top plan view of the apparatus shown in Fig. 1.

Fig. 3 is an enlarged, fragmentary, detail view of the top edge of the tank shown in Figures 1 and 2.

The invention will be described in the treatment of sanitary sewage, but it will be understood that substantially the same procedure is applicable to the separation of other oxidizable materials from a liquid. The separation of salts, for example, is simpler than the flocculation of organic matter contained in sewage because there is no biochemical oxygen demand as in the case of material being acted upon by aerobic micro-biological organisms.

Settled sewage is supplied through a conduit 10 to a chamber 11 at the upper end of a draft tube 12. This draft tube 12 preferably has a tapered approach passage, and there is an oxygen diffuser 14 located at the entrance of the draft tube 12 for injecting bubbles of oxygen into a stream of liquid. The oxygen from the diffuser 14 is at a controlled pressure, or within a controlled pressure range, slightly higher than atmospheric pressure, to overcome the pressure in the chamber 11.

The cross section of the draft tube 12 is reduced to give the liquid stream a velocity that is high enough to carry the oxygen from the diffuser 14 down the draft tube 12 in the form of bubbles. More and more oxygen is dissolved in the liquid as these bubbles move down the draft tube 12 and encounter higher and higher pressure as the result of the increased hydraulic head at the lower levels of the draft tube.

The oxygen from the diffuser 14 may be commercial oxygen having a purity of the order of 95% or better. However, oxygen of any purity can be used for this invention and when the oxygen concentration is low, the oxygen recapture provisions of the invention are not used.

With a 95% purity oxygen used in this invention, only 10 to 20% as much total oxygen is required to satisfy the biochemical oxygen demand of the aerobic micro-biological organisms as is the case in activated sludge processes in which the oxygen supplied is atmospheric oxygen diluted with the nitrogen and other gases that are present in air. This difference is important because oxygen comprises only about 20% of the atmosphere and in supplying 5 to 10 times as much atmospheric oxygen it is necessary to pump from 25 to 50 times as much total gas. Atmospheric oxygen is free at the source, but power requirements for pumping it in volumes of air are costly.

Another significant consideration is the time required for treating the sewage. As compared with the activated sludge, this invention reduces the time of treatment as much as 75 to 80%. This is very important from an economic viewpoint because of the resulting reduction in the sizes of the biochemical retention basins or tanks that are used for holding the sewage during treatment.

The lower end of the draft tube 12 open into a pipe 16 which communicates with a biochemical retention tank 18. This tank has a bottom 19 and a substantially cylindrical side wall 20 with a series of openings 21 angularly spaced around the side wall 20 at a zone intermediate the lower and upper ends of the tank 18. The openings 21 communicate with a collector chamber 23 extending around the outside of the tank wall 20.

At an intermediate zone there is a series of openings 25 angularly spaced around the side wall 20 and communicating with an intermediate collector chamber 27 which extends around the wall 20. There are other openings 28 at an upper zone above the level of the sludge blanket and these upper openings communicate with an upper collector chamber 29. All of the collector chambers 23, 27 and 29 open into pump supply reservoirs 30 from which liquid, with its complement of sludge, is withdrawn by a pump 32 and delivered back to the chamber 11 to mix with the settled sewage from the conduit 10, and to dilute the stream flowing through the draft tube 12. There are adjustable orifices 33 at the ends of the respective collector chambers 23, 27 and 29 for regulating the relative amount of liquid taken from each of the chambers 23, 27 and 29.

In the portion of the tank 18 immediately over the pipe 16 there is a vessel 34 closed at the top. A vacuum breaker tube 36 extends through the top of the vessel 34. The tube 36 comes down for a substantial distance into the vessel 34 and preferably is a V-tube at its lower end. The tube 36 extends for some distance above the top of the vessel 34 to provide a column of liquid high enough to balance the difference in pressure between the surrounding atmosphere and the gas pressure under the top of the tank 18.

The space above the liquid in the vessel 34 is filled with oxygen and is connected to the diffuser 14 by a feed line 38. Oxygen is supplied to the oxygen space or chamber in the top of the vessel 34 from an oxygen pressure line 39 commanded by a valve 40 which is opened and closed by the movement of a float 41.

Pressure of the oxygen in the vessel 34 depresses the level of the liquid and causes the float 41 to move downward and close the valve 40, thus shutting off the supply of oxygen from the pressure line 39. The pressure urging the oxygen through the feed line 38 depends upon the difference in the liquid level within the vessel 34 and that in the tank 18 outside of the closed vessel 34. The oxygen chamber at the top of the vessel 34, with its float-operated valve 40 and hydraulic head for urging the gas into the feed line 38, comprises a pressure regulator for the oxygen.

It is more than a mere pressure regulator, however, because it is also responsive to the absorption of oxygen by the liquid. Any excess oxygen that is not dissolved in the liquid, while passing through the draft tube 12 and the pipe 16, bubbles up through the sludge in the vessel 34 and escapes into the oxygen space in the top of the vessel 34. Any undissolved oxygen, therefore, is recaptured and fed back to the diffuser 14. This prevents waste of oxygen.

At the bottom of the vessel 34, pipes 42 radiate in all directions across the bottom of the tank 18. These pipes 42 are perforated along their lengths at closely spaced points so that liquid containing the settled sewage and dissolved oxygen flows from the vessel 34 and out through the openings in the pipes 42 over the entire bottom of the tank 18 with substantially uniform distribution. This liquid is displaced upward, through the suspended sludge in the tank 18, by other liquid discharging from the perforations in the pipes 42. This upward movement of the newly introduced liquid from the pipes 42 causes accumulations of the suspended sludge to break up and this avoids the formation of masses of sludge which would become too large and would become anaerobic in the center. The velocity of the upwardly moving liquid is low, but it is sufficient to maintain the sludge blanket at a level intermediate the upper and lower ends of the tank 18.

Some additional mechanical stirring at the bottom of the tank 18 is desirable, however, so as to prevent the occasional formation of currents of liquid that rise straight upward from the perforations in the pipes 42 and through the overlying sludge blanket without stirring or mixing with the sludge. Mechanical stirring has the additional advantage of reducing the number of pipes 42 and the number of openings in these pipes under the sludge blanket.

Breaking up of accumulations in the tank 18 is obtained from outwardly extending blades 45 connected with a hub 46 that turns on a ring 47 attached to the outside of the vessel 34 at a low level in the tank 18. The hub is rotated at slow speed by a belt 48 driven by a motor 50 and passing around suitable pulleys 51 to control the direction of movement of the belt. The blades 45 and their connected structure including the belt drive are diagrammatically illustrated and are merely representative of power means for mechanically breaking up accumulations of the contents of the tank 18.

At the top of the side wall 20 of the tank 18 there is an overflow with a saw-tooth edge 54 that permits the top liquid in the tank to drain off into collector conduits 55. From these conduits 55 the effluent flow to drain pipes 56. Some oxygen remains dissolved in the effluent for effecting its final purification after it leaves the tank 18. Excess sludge from the tank 18 is periodically removed by opening a valve 60 that puts the pipe 16 into communication with a drain pipe 61 leading to a sludge concentrator.

Each time that sludge is drained from the tank 18, only a portion of the sludge is removed because time is required to build up a sludge when starting the system after it has been fully drained. Experience has shown that even with settled sewage, seeding of micro-biological organisms is not required, and within three days sufficient sludge is accumulated for about 80% purification.

Liquid containing its complement of sludge is drawn off at different levels below the surface of the liquid in the tank 18. In the apparatus shown the sludge-bearing liquid that passes through the openings 21 and 25, and clear liquid that passes through the openings 28, is pumped into the chamber 11 in sufficient quantity to dilute the sewage to a biochemical oxygen demand less than the saturation value of the oxygen in an atmosphere of oxygen at room temperature and normal atmospheric pressure. Higher saturation values for the oxygen can, of course, be obtained by having the entire system operate under pressure; but there are structural and operational advantages in having the tank 18 open at the top and exposed only to normal atmospheric pressure.

With prior methods of sewage treatment, the biochemical oxygen demand of the raw sewage is not known for five days, and continuous adjustment of operation to changing strength of the raw sewage is very difficult if not impossible. The operation of this invention permits a continuous and almost instantaneous determination of the strength of the raw sewage by measurement of the dissolved oxygen concentration below and above the sludge blanket. Operating adjustments to accommodate changes in strength of the influent sewage can be made continuously. The operating regimen is to recirculate sufficient quantity of liquid to maintain a dissolved oxygen concentration in the plant effluent about equal to saturation with respect to the atmosphere at the prevailing temperature or any other desired dissolved oxygen concentration. With regard to the treatment of changing industrial waste loadings, this process is superior to prior methods because of the inherent advantages in operation.

High operating pressure and greater saturation pressure for the oxygen can be obtained without closing the tank 18, by merely increasing the depth of the tank 18. The recirculation feature of the invention becomes less important with deeper tanks because less dilution of the incoming sewage is necessary.

Experience has demonstrated that the aerobic micro-biological organisms thrive in spite of excess oxygen in the sludge and even when under considerable pressure in the presence of excess oxygen. This makes it practical to have dissolved oxygen for final purification in the effluent that drains from the system.

As an example of the use of the recirculation feature for diluting the incoming sewage, the following illustration may be taken. With a biochemical retention basin or tank 18 having a depth of 20 feet, oxygen can be introduced into the draft tube 12 carrying settled sewage at a velocity of the order of 10 feet per second to the inlet at the bottom of the tank 18 and compressing the diffused oxygen bubbles as they are carried to greater depths. At 20° C. and 20 feet of head over atmospheric, the oxygen taken into solution may be about 69 parts per million.

If the settled sewage has a biochemical oxygen demand of 138 parts per million, the chamber 11 should be supplied with a volume of recirculating liquid from the tank 18, from which all or most of the oxygen has been consumed, equal to the volume of settled sewage entering the chamber 11. In these circumstances the oxygen saturation is made substantially equal to the biochemical oxygen demand of the sewage which has been diluted by one half upon entering the system. By adjusting relative volumes of settled sewage and recirculated liquid, variations in the biochemical oxygen demand of the settled sewage, and in the desired amounts of dissolved oxygen, can be obtained. The figures given herein are merely illustrative.

The invention can be applied to the removal of organic matter from various industrial wastes and from highly colored waters with apparatus and procedure similar to that already outlined for the treatment of sewage. Similarly, the invention can be used to convert bases of salts dissolved in liquids into their higher oxidized and relatively insoluble forms to effect substantial separation. No biochemical oxygen demand is involved in this latter situation, but the process provides a favorable environment for oxidation, flocculation, precipitation and separation of insoluble products from the liquid by furnishing high oxygen concentrations with non-turbulent flow conditions.

Although the apparatus illustrated in the drawing utilizes substantially vertical movement of the liquid and dissolved oxygen in the tank 18, it will be understood that the liquid can be introduced into the tank in tangential directions to cause a helical or spiral movement of liquid in the tank, and where such circular movements are used, the axis of the movement need not be vertical. Other changes and modifications can be made and some features of the invention can be used alone or in different combinations without departing from the invention as defined in the claims.

I claim as my invention:

1. In the flocculation by the action of aerobic micro-biological organisms on organic matter contained in a liquid mass, the method which comprises introducing a stream of the liquid mass into a biochemical retention tank in which the liquid mass passes upward through an active biological floc, supplying to the stream, as it flows to the tank, a quantity of oxygen limited to approximately the amount of oxygen that the stream will dissolve at substantially atmospheric pressure, withdrawing some of the liquid mass from a zone of the tank where the liquid mass has been subjected to the action of the aerobic micro-biological organisms by passage through at least a portion of the floc, feeding the liquid mass thus withdrawn into the stream flowing to the tank and upstream of the oxygen supply and in such quantity as to dilute the stream of new liquid mass down to a quantity that makes the biochemical oxygen demand of the stream as low as the quantity of oxygen that will dissolve in the stream, and withdrawing clarified effluent from the top of the tank.

2. The method described in claim 1 in which the liquid mass withdrawn for recirculation with the stream of new liquid entering the tank is obtained by withdrawing the liquid mass from several different intermediate levels of the biochemical retention tank all of which levels are above the bottom of the floc and the uppermost of which levels is above the top of the floc so that liquid withdrawn from the uppermost level has travelled completely through the floc, and a mixture of the liquid mass withdrawn from these different levels is fed into the incoming stream.

3. The bio-precipitation method of treating sewage which comprises introducing a stream of sewage into a biochemical retention tank under a sludge blanket, subjecting the sewage to the action of aerobic microbiological organisms in the tank to effect oxidation of organic matter in the sewage, by passing the sewage at a gradual rate through the sludge blanket, supplying the biochemical oxygen demand of the aerobic microbiological organisms by introducing oxygen into the stream of sewage as it approaches the tank, distributing the stream of sewage over the cross-section of the tank, collecting in a vessel at one end of the tank such oxygen as is not dissolved in the sewage prior to distribution of the sewage over the cross section of the tank, returning the collected oxygen to the incoming stream of sewage, and withdrawing clarified effluent from the top of the tank.

4. The method of treating sewage as called for by claim 3 and in which liquid with its complement of solid matter is withdrawn from at least one zone intermediate the ends of the tank and above the bottom level of the floc, and such liquid with its complement of solid matter is introduced into the stream of sewage approaching the tank to dilute the sewage of said stream.

5. The bio-precipitation method of treating sewage comprising introducing oxygen into a stream of sewage, conducting the stream with said oxygen to an inlet of a tank, distributing the sewage of said stream over a zone of the tank under an active biological floc beyond the inlet at which the stream is introduced into the tank, collecting in a vessel in the region immediately above the inlet any undissolved oxygen that rises from the inlet, returning the collected oxygen to the stream of sewage approaching the tank, and withdrawing clarified effluent from the top of the tank.

6. In the treatment of sewage by aerobic micro-biological organisms in a biochemical retention tank, the improvement which comprises supplying oxygen to a stream of sewage in a conduit leading to the biochemical retention tank and at sufficient distance from said tank to allow time for the oxygen to be dissolved in the sewage while in said conduit, introducing the stream of sewage and dissolved oxygen through an inlet and into the tank at a low level below a blanket of active biological floc, collecting in a vessel in the region immediately above the inlet any undissolved oxygen that rises from the inlet through the sewage, passing the sewage upward at a gradual rate through the floc at the other regions of the tank beyond that immediately above the inlet, and withdrawing clarified effluent from the top of the tank.

7. The method of treating sewage comprising supplying a stream of sewage through a conduit to a biological retention tank, introducing oxygen into the sewage stream at a region of said conduit spaced a substantial distance from the inlet at which the conduit communicates with the tank, enclosing a zone immediately above the inlet for receiving oxygen that is not dissolved in the sewage when sewage enters the tank maintaining a pressure head of oxygen on the surface of the liquid in the tank at said zone immediately above the inlet, supplying oxygen from said zone to the stream of sewage in the conduit, regulating a supply of additional oxygen to said zone in accordance with fluctuations in the liquid level at said zone as affected by undissolved bubbles of oxygen rising through the liquid above said inlet of the tank, passing the sewage upward through a blanket of active biological floc surrounding the zone that is above the inlet, and withdrawing clarified effluent from the top of the tank.

8. The bio-precipitation method of treating sewage comprising saturating the sewage with oxygen, removing undissolved bubbles of gas from the sewage and then introducing the oxygen saturated sewage under a suspended biological floc in a biochemical retention tank, the sewage being introduced at a plurality of locations spaced radially and angularly from one another over the lower portion of the tank under the floc, agitating the sewage immediately above the locations at which it is introduced into the tank so as to distribute the sewage more uniformly over the cross section of the tank, draining off effluent from the upper end of the tank, and coordinating the rate of introduction of fresh sewage into the tank with the rate of action of the micro-biological organisms to obtain oxidation of most of the organic matter in the sewage by the action of the aerobic micro-biological organisms during one passage of the sewage through the floc.

9. In the treatment of sewage by oxidizing organic matter through the action of aerobic micro-biological organisms as the sewage passes through a biological floc in a biochemical retention tank, the improvement that comprises supplying the sewage to the tank through a conduit, introducing oxygen into the conduit at a substantial distance from the retention tank, dispersing the oxygen at the region of introduction into small bubbles, maintaining the velocity of the sewage flow high enough to carry the oxygen along with the sewage stream as entrained bubbles of gas in order to provide favorable opportunity for the oxygen to dissolve in the sewage stream before the stream reaches the tank, collecting the oxygen that does not dissolve in the sewage before discharging the sewage under the floc in the retention tank so as to avoid agitation of the floc and sewage by gas bubbles rising in the tank, and withdrawing effluent from the top of the tank.

10. The method described in claim 9 and in which the conduit has a downwardly extending portion, and the oxygen bubbles are introduced into the sewage stream at a region in the upper part of the downwardly extending portion of the conduit so that the oxygen bubbles are progressively compressed as the stream moves downward and is subjected to an increasing hydraulic pressure head.

11. In the production of relatively stable organic substances from waste material by the action of aerobic micro-biological organisms, the improvement that comprises supplying the moisture and oxygen for the aerobic micro-biological organisms by pre-oxygenating the liquid to be treated so that the liquid itself is the oxygen carrier with the oxygen dissolved in the liquid, distributing the liquid and dissolved oxygen in a biological retention tank substantially uniformly throughout that portion of the cross section of the tank which is under a suspended biological floc, passing the oxygenated liquid upward through the suspended biological floc in the tank throughout said cross section and at a low velocity sufficient to maintain the floc suspended at an intermediate level of the tank, and withdrawing effluent from the top of the tank.

12. Apparatus for treating sewage by the action of aerobic micro-biological organisms, said apparatus comprising a biochemical retention tank having an inlet at a low level, a conduit through which a stream of sewage flows to the tank, apparatus for introducing bubbles of oxygen into the stream of sewage flowing through the conduit and at a substantial distance from the inlet of the tank, a gas bell over a portion and only a portion of the tank above the inlet for trapping undissolved bubbles of oxygen, piping through which the trapped oxygen from the bell is returned with additional oxygen to the conduit at the region where oxygen is introduced into the sewage stream, and means for withdrawing effluent from the top of the tank.

13. Sewage treating apparatus comprising a biochemical retention tank in which sewage is subjected to the action of aerobic micro-biological organisms as the sewage passes through a biological floc, a conduit through which a stream of sewage flows to the tank at a velocity sufficiently high to carry entrained bubbles of oxygen along with the stream, said conduit having a downwardly extending portion, a diffuser located at an upper part of the downwardly extending portion of the conduit for introducing bubbles of oxygen into the sewage stream, an oxygen collector located beyond the downwardly extending portion of the conduit in position to collect bubbles of gas that are not dissolved in the sewage stream before the stream is introduced into the portion of the tank under the biological floc, and means for withdrawing effluent from the top of the tank.

14. Sewage treating apparatus comprising a biochemical retention tank for holding sewage while it is subjected to the action of aerobic micro-biological organisms as the sewage passes through a biological floc, a gas bell with its lower end immersed in the sewage in the tank, a sewage inlet at a low level of the tank and directly under the gas bell so that undissolved bubbles of gas in the sewage are collected by the gas bell before the sewage is distributed under the floc, a distributor that deflects sewage from the inlet across the tank and under the floc, a conduit through which a stream of sewage flows to the tank inlet, an oxygen diffuser in the conduit at a substantial distance upstream from the tank inlet, a supply line through which oxygen is supplied to the upper end of the gas bell, a valve commanding said supply line, a float in the bell for operating the valve in response to fluctuations in the liquid level in the bell, an oxygen conduit leading from the bell to the diffuser, and means for withdrawing effluent from the top of the tank.

15. Apparatus for treating sewage by the action of aerobic micro-biological organisms as the sewage passes through a biological floc, said apparatus comprising a biochemical retention tank having an inlet, a conduit through which a stream of sewage flows to said inlet, an oxygen diffuser for introducing oxygen into the stream of sewage at a region of the conduit located a substantial distance upstream from the tank, an oxygen collector on the tank in position to collect bubbles of gas that are not dissolved in the sewage stream before the stream is introduced into the portion of the tank under the biological floc so that undissolved bubbles of gas in the sewage pass into the collector before the sewage is distributed under the floc, a distributor that deflects sewage from the inlet across the tank and under the floc, means for circulating oxygen from said collector back to the diffuser, a recirculating liquid line leading from a zone intermediate the ends of the tank to an inlet communicating with said conduit at a substantial distance upstream from the tank inlet, a pump for pumping liquid from the tank through the recirculating liquid line to said inlet of the conduit, and means for withdrawing effluent from the top of the tank.

16. Sewage treating apparatus comprising a biochemical retention tank in which sewage is treated by the action of aerobic micro-biological organisms as the sewage passes through a biological floc, said tank having a bottom and having an open top for the draining of effluent, a gas bell located in the tank with the lower edge of the gas bell resting on the bottom of the tank, a conduit through which a stream of sewage is introduced into the tank through an inlet communicating with the interior of the gas bell, a diffuser for introducing oxygen into the stream of sewage at a region of the conduit, a gas line connected with the upper portion of the bell for withdrawing oxygen that collects above the liquid in the bell, perforated pipes communicating with the interior of the bell immediately above the bottom of the tank, said pipes radiating from the bell in different directions for distributing substantially bubble-free sewage over the bottom of the tank under the biological floc, and means for withdrawing effluent from the top of the tank.

17. The combination comprising a biochemical retention tank in which sewage is treated by the action of aerobic micro-biological organisms as the sewage passes through a biological floc, said tank having a bottom with an inlet through which a stream of oxygen-saturated sewage flows into the tank, conduits for distributing the sewage from the inlet substantially uniformly in all directions over the bottom of the tank, an oxygen collector above the inlet in position to collect bubbles of gas that are not dissolved in the sewage stream before the stream is introduced into the portion of the tank under the biological floc, mechanical means around the oxygen collector for mixing the incoming supply of sewage with the contents in the bottom of the tank, and means for withdrawing effluent from the top of the tank.

18. The method of treating sewage which comprises dissolving, in a stream of liquid containing raw sewage, a quantity of substantially pure oxygen limited to approximately that amount of oxygen which the stream will dissolve, passing said stream of oxygen-containing liquid into the lower portion of a mass of liquid containing biologically active floc in suspension, diluting said stream of liquid containing raw sewage prior to the addition of oxygen with effluent from said mass of liquid to provide a volume of liquid sufficient to dissolve under conditions of substantial saturation sufficient oxygen to supply substantially the entire oxygen requirements of the process, and withdrawing clarified effluent from the top of the mass of liquid.

MALCOLM PIRNIE.

REFERENCES CITED

The following references are of record in the file of this patent:

UNITED STATES PATENTS

| Number | Name | Date |
|---|---|---|
| 360,593 | Hyatt | Apr. 5, 1887 |
| 973,263 | Darapsky | Oct. 18, 1910 |
| 1,047,534 | Joseph | Dec. 17, 1912 |
| 1,394,698 | Trent | Oct. 25, 1921 |
| 1,808,956 | Ketterer | June 9, 1931 |
| 1,900,809 | Hammerly | Mar. 7, 1933 |
| 2,254,953 | Thomas | Sept. 2, 1941 |
| 2,337,507 | Thayer | Dec. 21, 1943 |
| 2,355,564 | Sebald | Aug. 8, 1944 |
| 2,374,772 | Nordell | May 1, 1945 |
| 2,404,223 | Durdin, 3d | July 16, 1946 |
| 2,458,163 | Hays | Jan. 4, 1949 |

FOREIGN PATENTS

| Number | Country | Date |
|---|---|---|
| 14,733 | Great Britain | of 1915 |
| 519,616 | Germany | of 1931 |